United States Patent [19]

Hagner et al.

[11] 3,992,814
[45] Nov. 23, 1976

[54] METHOD FOR SORTING SEEDS

[76] Inventors: Mats Bernhard Hagner, Blabarsvagen 19, 902 35 Umea; Karl Lennart Wendt, Stocksjo, 910 26 Umea, both of Sweden

[22] Filed: May 19, 1975

[21] Appl. No.: 578,854

[30] Foreign Application Priority Data
May 17, 1974 Sweden ............................ 74066325

[52] U.S. Cl. .................................. 47/58; 209/162; 47/1 R; 111/1; 47/61
[51] Int. Cl.² ........................................ A01G 1/00
[58] Field of Search .................. 47/1.2, 58, 48.5, 1, 47/58, 1.2; 417/472, 479, 473, 474, 475, 476, 477, 478; 209/160, 161, 162, 163, 164; 111/1

[56] References Cited
UNITED STATES PATENTS

| | | | |
|---|---|---|---|
| 1,988,624 | 1/1935 | Kipp | 417/479 X |
| 2,698,087 | 12/1954 | Call et al. | 209/158 |
| 2,711,134 | 6/1955 | Hughes | 417/479 X |
| 2,945,589 | 7/1960 | Olney | 209/164 |
| 2,976,992 | 3/1961 | Bloch | 209/162 X |
| 3,032,194 | 5/1962 | Evans et al. | 209/158 |
| 3,046,903 | 7/1962 | Jones | 417/478 X |
| 3,070,228 | 12/1962 | Hollingsworth | 209/160 |
| 3,717,085 | 2/1973 | Sato | 47/1.2 X |
| 3,865,315 | 2/1975 | Roberts et al. | 209/162 |

*Primary Examiner*—Edgar S. Burr
*Assistant Examiner*—James R. Feyrer
*Attorney, Agent, or Firm*—Sughrue, Rothwell, Mion, Zinn and Macpeak

[57] ABSTRACT

A method apparatus of sorting germinating seeds from non-germinating seeds. The seeds are disposed on the surface of a liquid carrying the seeds and germinating seeds are separated from non-germinating seeds by means of liquid streams acting on parts projecting down into the liquid from the germinating seeds.

7 Claims, 1 Drawing Figure

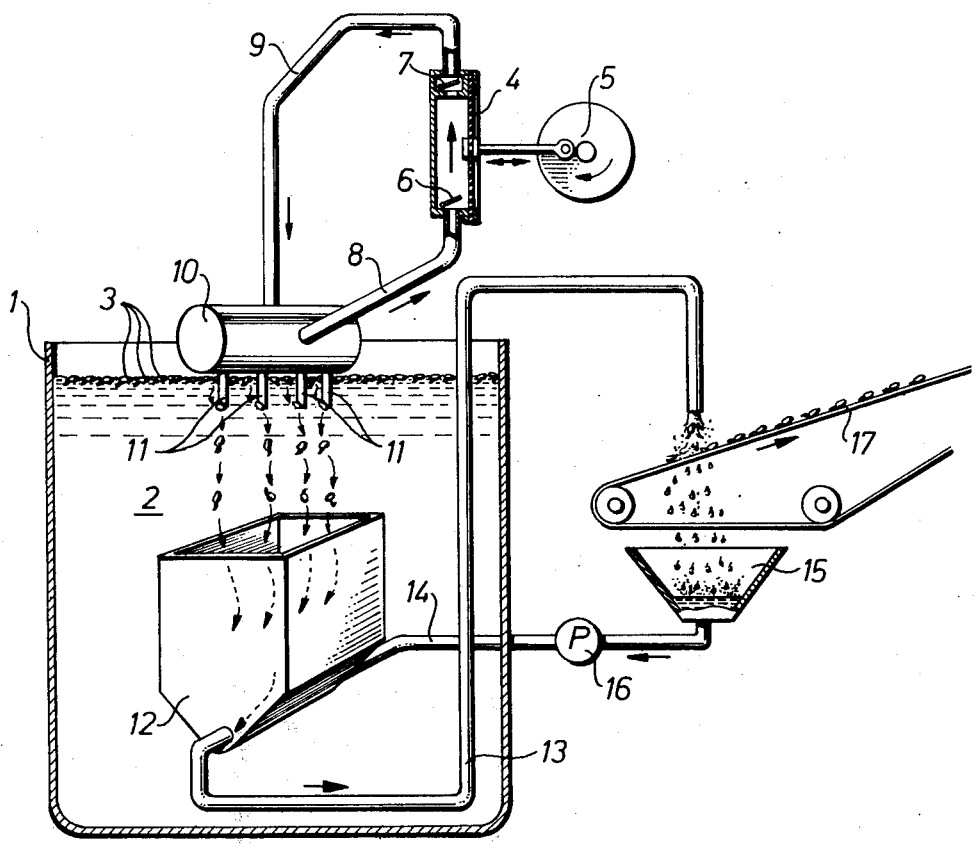

METHOD FOR SORTING SEEDS

BACKGROUND OF THE INVENTION

1. Field of the Invention

This invention relates to a method and apparatus for sorting out from a large quantity of seeds which have been kept under conditions well adapted for germination such seeds which then have started the germination process.

2. Prior Art

Dry seeds, i.e. seeds having a relatively low moisture content, are usually used for sowing. This means that a relatively long time elapses from sowing until the seed has absorbed sufficient moisture to be able to shoot out germs. It has already been realised that this time can be appreciably reduced by allowing the seeds to absorb moisture and start the germination process before sowing. In a common method for this purpose, the seeds have been comletely immersed in a vessel containing water. Although the seeds undoubtedly absorb the water and start the germination process, their subsequent development tends to cease, and this would appear to be due to the fact that they do not get sufficient oxygen. Seeds not only require considerable humidity but also good supply of oxygen for their development. Pretreatment of seeds as above can be interrupted at the required stage, for example immediately before the seed hull bursts and germs appear. This means that the heartiness of the seeds remains.

Plant growing could also be made more efficient if only those seeds which will result in a plant could be selected before sowing. This would do away with empty gaps in sown rows or empty pots in the case of growing plants in pots, without any thinning being necessary due to more than one seed being sown in each place for safety. To fulfil these requirements, it must be possible to separate those seeds which have commenced the germination process on contact with moisture from those seeds which are unable to germinate for some reason. In prior growing methods it has not been possible to carry out such sorting before the seeds have resulted in small plants. However, this makes considerable demands on storage space, inter alia, and subsequent handling of the plants, and this makes it difficult, for example, to mechanize the planting in a natural environment.

It is therefore desirable for the seed germination to be effected in such a manner that germinating seeds can be sorted out from non-germinating seeds easily and at the earliest possible stage. Sorting should be carried out at a stage such that the seeds selected for sowing can be handled in substantially the same way as non-pregerminated seeds. Sorting must also be possible at very high speed.

SUMMARY OF THE INVENTION

One of the main objects of the present invention is to provide a method and apparatus allowing simple and rapid sorting of germinating from non-germinating seeds at a very early stage of the germination process.

According to the invention, to this end, all the seeds are disposed on the surface of liquid carrying the seeds. The seeds may be carried either by the surface tension of the liquid or as a result of differences in density between the liquid and the seeds.

Disposing the seeds on a liquid surface results among other things in that the seeds are readily laterally transportable on the liquid, for example by means of streams of air or liquid. The seeds can thus readily be directed past suitable detector and/or sorting means, which may be disposed in the liquid, this being essential to early sorting since the first external changes in a germinating seed are usually detectable first from the underside of the seed. The liquid also allows the detecting and/or sorting means to be moved in the liquid to different seed positions.

It has proved particularly advantageous to select the seed and liquid combination in such a manner that the seeds are carried by the surface tension of the liquid. In these conditions, for sorting germinating seeds from non-germinating, parts projecting from the germinating seeds down into the liquid can readily be utilized for sorting purposes. In the case of seeds having a higher density than the liquid, said parts can be used to pull down germinating seeds beneath the surface of the liquid whereupon they will sink freely to the bottom of the liquid container, where they can be suitably collected. This type of sorting can be carried out at a very early stage of the germination process, i.e. as soon as the tip of a small germ or sprout or the like projects down into the liquid. It has also been found that even before the tip of a sprout penetrates the seed hull some seeds bind the water to form a gel at the hull which gel can be utilized as a sorting factor. Such gels are in the following description and in the claims considered as equivalents to and covered by the expression parts projecting down into the liquid from the seeds. Since germinating seeds can be sorted out at a very early stage, they can subsequently be handled substantially in the same manner as non-germinated seeds and, inter alia, this greatly simplifies sowing. Alternatively, even if the seeds are carried by the liquid as a result of differences in density, a plurality of sorting principles is feasible on the basis of parts projecting down from the germinating seeds.

The method and apparatus for germination and sorting described can be utilized not only for seeds but also for other parts of plants having the ability to develop a root system and grow into plants, e.g. cuttings, pieces of root, tubers and the like. The term "seed" as used in this description and in the claims should therefore be regarded as a comprehensive term covering all plant parts capable of giving rise to a plant. When certain seeds or other plant parts are disposed on a liquid surface it may be advantageous for the liquid and/or the seed to be treated with an agent to change the surface tension. Similarly, the density of the liquid can also be varied by suitable additives if required. Such agents and additives are known to a man skilled in the art.

BRIEF DESCRIPTION OF THE DRAWING

The invention will be described in detail hereinafter with reference to the drawing which shows an embodiment of an apparatus according to the invention for germinating seeds and sorting germinating from non-germinating seeds.

DESCRIPTION OF THE PREFERRED EMBODIMENT

Referring now to the drawing, element 1 denotes a container containing an aqueous liquid 2. The liquid 2 carries a plurality of seeds 3 intended for germination. The seeds are in contact partly with the liquid 2 and partly with the surrounding air, and this ensures that they can rapidly absorb sufficient moisture while obtaining a good oxygen supply. Moisture adsorption is also improved because the air surrounding the seed obtains a very high moisture content. With the seeds disposed on a liquid surface as shown in the drawing, all the seeds will have exactly the same external conditions for germination, and this means that those seeds which have the ability to germinate will develop at substantially the same time. This is very important, because after sowing these seeds will result in plants of substantially the same size, and this reduces the risk of some late-developing plants being suppressed by plants which have developed at an earlier stage.

In order additionally to increase the moisture content around the seeds, the container 1 may be closed by means of a lid (not shown). The seed oxygen requirements are then provided by the air between the surface of the liquid and said lid. There is therefore no risk of any cessation of the development of the seeds as a result of lack of oxygen in this technique of germinating seeds.

In order to be able to sort germinating seed from non-germinating seed, it is only necessary to continue the germination process until a detectable change occurs characterstic of germination of the specific type of seed. The Figure illustrates equipment enabling germinating seed to be sorted out at a very early stage. The equipment comprises a diaphragm pump 4 driven by an eccentric device 5. The pump chamber is connected via check valves 6 and 7 to an inlet pipe 8 and an outlet pipe 9 respectively, both these pipes leading to a tubular chambe 10. The chamber 10 is along its underside provided with a number of cannulae 11 projecting down into the liquid so that their orifices are situated just below the level of liquid in the container 1.

The pump system including the cannulae 11, chamber 10, inlet pipe 8, chamber of pump 4 and the outlet pipe 9, is filled with liquid. Consequently, the drive provided by the eccentric device 5 from a motor (not shown) causes an alternating and substantially vertical stream of liquid to pass the openings of the cannulae 11. Consequently, on the pump intake stroke, if any of the seeds 3 supported by the surface tension near the cannulae have any part projecting down into the liquid, for example a gel formation, a germ or the like, they will be sucked down towards the openings of the cannulae and on the next working stroke of the pump the seeds will be pressed away from said openings and if they have a higher density than the liquid the seeds will sink to the bottom of the container 1.

A collecting tank 12, advantageously with inclined bottom surfaces, may be provided at the base of the container 1 to collect the germinating seed separated in this way. A pipe 13 leads from one side of the container 12 and liquid flows out through the same on the syphon principle. A supply pipe 14 leads into the opposite side wall of the container and through it liquid flows from a collecting vessel 15, being pumped into the container 12 by a liquid pump 16. The liquid flowing out through pipe 13 is collected in the vessel 15 so that the level of liquid in the container 1 can be kept essentially constant. The flow of liquid through the pipe 13 conveying the seeds collected in the tank 12 is advantageously discharged on a belt conveyor 17 disposed above the vessel 16 and acting as a filter. A series of seeds all at substantially the same stage of germination will thus be separated on the conveyor belt 17. The stage of development of the separated seeds can be selected, for example, by varying the depth of the openings of the cannulae. Since sorting can be effected at a very early stage, the selected seeds can be treated essentially like normal dry seeds, but have considerably improved germinatability; which for certain species may reach essentially 100%.

In order to increase separation effectiveness the seeds can be directed past the cannulae by streams of air or liquid or can the cannulae be disposed to be movable amongst the seeds. The cannulae can also be replaced by other means, for example disposed in the liquid, and having orifices discharging immediately beneath the level of liquid and for instance adapted to be subjected to suction. Separation of germinating seeds as above can also be obtained simply by forcing streams of liquid through cannulae or the like discharging beneath the surface, the germinating seeds being moved by the resulting vertical flows in the liquid. Corresponding effect can also be obtained by means of streams of liquid just passing into openings disposed beneath the liquid surface which streams are interrupted at short intervals to release seeds held against the openings.

The above-described apparatus can also be used for seeds having a lower density than the liquid, in which case the cannulae 11 can be directed obliquely downwards so that the seeds which are sucked towards the openings of the cannulae and then forced away will float to the surface at a given distance from the cannulae, suitable shielding means being disposed between the cannulae and that place.

The sorting apparatus above described should be regarded only as one preferred embodiment of the invention. Various types of sorting devices can be used, the common feature to all of them being that they utilize the great advantage of the invention, i.e. seeds carried directly by the surface of a liquid during the sorting operation. Of course the said liquid need not be the same as the liquid which carried the seeds in conjunction with germination, but may if required be another liquid, inter alia for reasons associated with density conditions, desired surface tension or the like. Further, the seeds can also have been caused to germinate at another place and being disposed on the liquid surface for the first time in conjunction with the sorting operation.

Although vertical liquid flows are used in the above-described embodiment, horizontal flows immediately beneath the level of the liquid can be used for sorting to transport the germinating seeds laterally on the surface of the liquid. Another way of sorting is to detect parts projecting from the seeds, such as germs, by a photoelectric cell arrangement. Mechanical sorting means can also be used. For example, a rotating brush or the like may be disposed just below the surface of the liquid, germinating seeds catching on the brush bristles and being pulled down below the surface. The seeds can also be transported laterally by mechanical means which catch in the germs. A number of other sorting principles are feasible, again being based on the advantage of the ready mobility of seeds on a liquid surface. The liquid also gives the advantage that all the seeds are situated in a accurately defined common plane.

What we claim is:

1. A method of sorting a large quantity of seeds to determine which have germinated, comprising the steps of: keeping the seeds under conditions well adapted for germination of such seeds for a duration sufficient to start the germination process; disposing all seeds directly on the surface of a liquid carrying the seeds; and sorting out seeds having started the germination process, said sorting utilizing means within the liquid acting on parts projecting down into the liquid from the germinating seeds.

2. Method according to claim 1, wherein the seeds are carried directly by the surface of an aqueous liquid of higher density than said seeds during both germination and sorting.

3. The method according to claim 1, wherein germinating seeds are sorted out by the step of generating streams in the liquid acting on said parts projecting down into the liquid.

4. The method according to claim 1, wherein the seeds are disposed on a liquid having a lower density than the seeds and such that the seeds are carried by the surface tension of the liquid, including the steps of: pulling down beneath the surface of the liquid the germinating seeds by means of substantially vertical streams acting on said parts, allowing the germinated seeds to sink freely towards the bottom and collecting the seeds.

5. The method according to claim 4, including the steps of reversing liquid streams at short intervals.

6. Apparatus for sorting out from a quantity of seeds which have been kept under conditions well adapted for germinating such seeds which then have started the germination process comprising: a container having liquid therein, said container having a quantity of seeds floating on the liquid therein; a stream generating means connected to a liquid pump and provided with a plurality orifices adapted to be arranged beneath the surface of said liquid in the container such that due to the action of the pump, liquid streams are passed through the orifices and seeds that have germinated are sorted by breaking the surface tension between the seeds and the liquid by said liquid streams.

7. Apparatus according to claim 6, comprising means for reversing the liquid streams through said orifices at short intervals.

* * * * *